US006937271B1

(12) United States Patent
Mori et al.

(10) Patent No.: US 6,937,271 B1
(45) Date of Patent: Aug. 30, 2005

(54) CAMERA SIGNAL PROCESSING DEVICE AND CAMERA SIGNAL PROCESSING METHOD

(75) Inventors: Yukio Mori, Hirakata (JP); Seiji Okada, Moriguchi (JP); Shoichi Hasegawa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/674,489

(22) PCT Filed: Mar. 7, 2000

(86) PCT No.: PCT/JP00/01365

§ 371 (c)(1),
(2), (4) Date: Nov. 9, 2000

(87) PCT Pub. No.: WO00/54508

PCT Pub. Date: Sep. 14, 2000

(30) Foreign Application Priority Data

Mar. 9, 1999 (JP) ................................. 11-061424

(51) Int. Cl.$^7$ ........................................... H04N 5/225
(52) U.S. Cl. ................................. 348/207.99; 348/155
(58) Field of Search ............................... 348/152–155, 348/143, 144, 94, 402.1, 413.1, 208.1, 208.2, 348/208.4, 208.5, 208.13, 208.14, 208.15, 348/208.16, 699, 413, 207.99; 382/151

(56) References Cited

U.S. PATENT DOCUMENTS

| | | | | |
|---|---|---|---|---|
| 5,267,034 A | * | 11/1993 | Miyatake et al. | ............ 348/352 |
| 5,644,372 A | * | 7/1997 | Shinjo et al. | ................ 349/139 |
| 5,754,225 A | * | 5/1998 | Naganuma | ................... 348/155 |
| 5,844,603 A | * | 12/1998 | Ogata | .......................... 348/155 |
| 6,002,428 A | * | 12/1999 | Matsumura et al. | ......... 348/169 |
| 6,023,524 A | * | 2/2000 | Yamaguchi | ................. 382/162 |
| 6,411,326 B1 | * | 6/2002 | Tabata | .......................... 348/47 |

FOREIGN PATENT DOCUMENTS

| | | | |
|---|---|---|---|
| JP | 02064898 A | 3/1990 | |
| JP | 06350897 A | 12/1994 | |
| JP | 08125910 A | 5/1996 | |
| JP | 08307757 A | 11/1996 | |
| JP | 09-044681 | 2/1997 | |
| JP | 09271018 A | 10/1997 | |
| JP | 10322684 A | * 12/1998 | ............ H04N 7/18 |
| JP | 10322684 A | 12/1998 | |

* cited by examiner

Primary Examiner—Tuan Ho
Assistant Examiner—Yogesh Aggarwal
(74) Attorney, Agent, or Firm—Arent Fox, PLLC.

(57) ABSTRACT

A camera signal processor having a motion detection component for dividing an image picked up by an imaging device into a plurality of motion detection areas, and detecting the motion of the image for each or the motion detection areas, an extracting component for extracting, on the basis of the motion of the image for each of the motion detection areas which has been detected by the motion detection component, the motion detection area where an object making abnormal motion exists, and an image enlarging component for enlarging the image picked up by the imaging device, centered on the motion detection area where an object making abnormal motion exists which has been extracted by the extracting component and displaying the enlarged image on a display device.

4 Claims, 3 Drawing Sheets

CAMERA SIGNAL PROCESSING DEVICE AND CAMERA SIGNAL PROCESSING METHOD

TECHNICAL FIELD

The present invention relates to a camera signal processor for detecting the motion of an image and processing a camera signal depending on the detected motion of the image and a camera signal processing method.

BACKGROUND ART

JP-A-8-125910 discloses a camera pursuing a subject. That is, the color of the subject is previously registered in the camera. When the registered color appears in an image picked up by the camera, the initial position of the subject is detected from information relating to the color. Thereafter, a motion vector of the subject is detected, to control the direction of the camera such that the subject is pursued depending on the detected motion vector.

In the camera, the color of the subject must be previously specified in order to detect the subject. In a system for imaging an unspecified subject, for example, a monitoring system using a monitoring camera, it is difficult to detect the subject in the same method as that in the above-mentioned camera.

An object of the present invention is to provide a camera signal processor capable of detecting, even when the color of a subject is not previously specified, the subject and enlarging and displaying the subject and a camera signal processing method.

DISCLOSURE OF INVENTION

A camera signal processor according to the present invention is characterized by comprising motion detection means for dividing an image picked up by imaging means into a plurality of motion detection areas, and detecting the motion of the image for each of the motion detection areas; extracting means for extracting, on the basis of the motion of the image for each of the motion detection areas which has been detected by the motion detection means, the motion detection area where an object making abnormal motion exists; and image enlarging means for enlarging the image picked up by the imaging means, centered on the motion detection area where an object making abnormal motion exists which has been extracted by the extracting means and displaying the enlarged image on a display device.

An example of the extracting means is one for extracting, out of the motion detection areas, the motion detection area where the motion of the image which has been detected by the motion detection means coincides with an abnormal motion pattern previously set as an area where an object making abnormal motion exists.

An example of the image enlarging means is one comprising group forming means for grouping, out of the motion detection areas where an object making abnormal motion exists which have been extracted by the extracting means, the areas where an object making abnormal motion exists such that the areas connected to each other form one group, center-of-gravity detecting means for extracting, out of groups formed by the group forming means, the group having the largest area, and finding the center of gravity of the extracted group, and scaling-up means for scaling up the image picked up by the imaging means, centered on the center of gravity found by the center-of-gravity detecting means, and displaying the scaled-up image on a display device.

A camera signal processing method according to the present invention is characterized by comprising the first step of dividing an image picked up by imaging means into a plurality of motion detection areas, and detecting the motion of the image for each of the motion detection areas; the second step of extracting, on the basis of the motion of the image for each of the motion detection areas which has been detected at the first step, the motion detection area where an object making abnormal motion exists; and the third step of enlarging the image picked up by the imaging means, centered on the motion detection area where an object making abnormal motion exists which has been extracted at the second step and displaying the enlarged image on a display device.

An example of the second step is one comprising the step of extracting, out of the motion detection areas, the motion detection area where the motion of the image which has been detected at the first step coincides with an abnormal motion pattern previously set as an area where an object making abnormal motion exists.

An example of the third step is one comprising the fourth step of grouping, out of the motion detection areas where an object making abnormal motion exists which have been extracted at the second step, the areas where an object making abnormal motion exists such that the areas connected to each other form one group, the fifth step of extracting, out of groups formed at the fourth step, the group having the largest area, and finding the center of gravity of the extracted group, and the sixth step of scaling up the image picked up by the imaging means, centered on the center of gravity found at the fifth step, and displaying the scaled-up image on a display device.

BEST MODE FOR CARRYING OUT THE INVENTION

Figure 1:
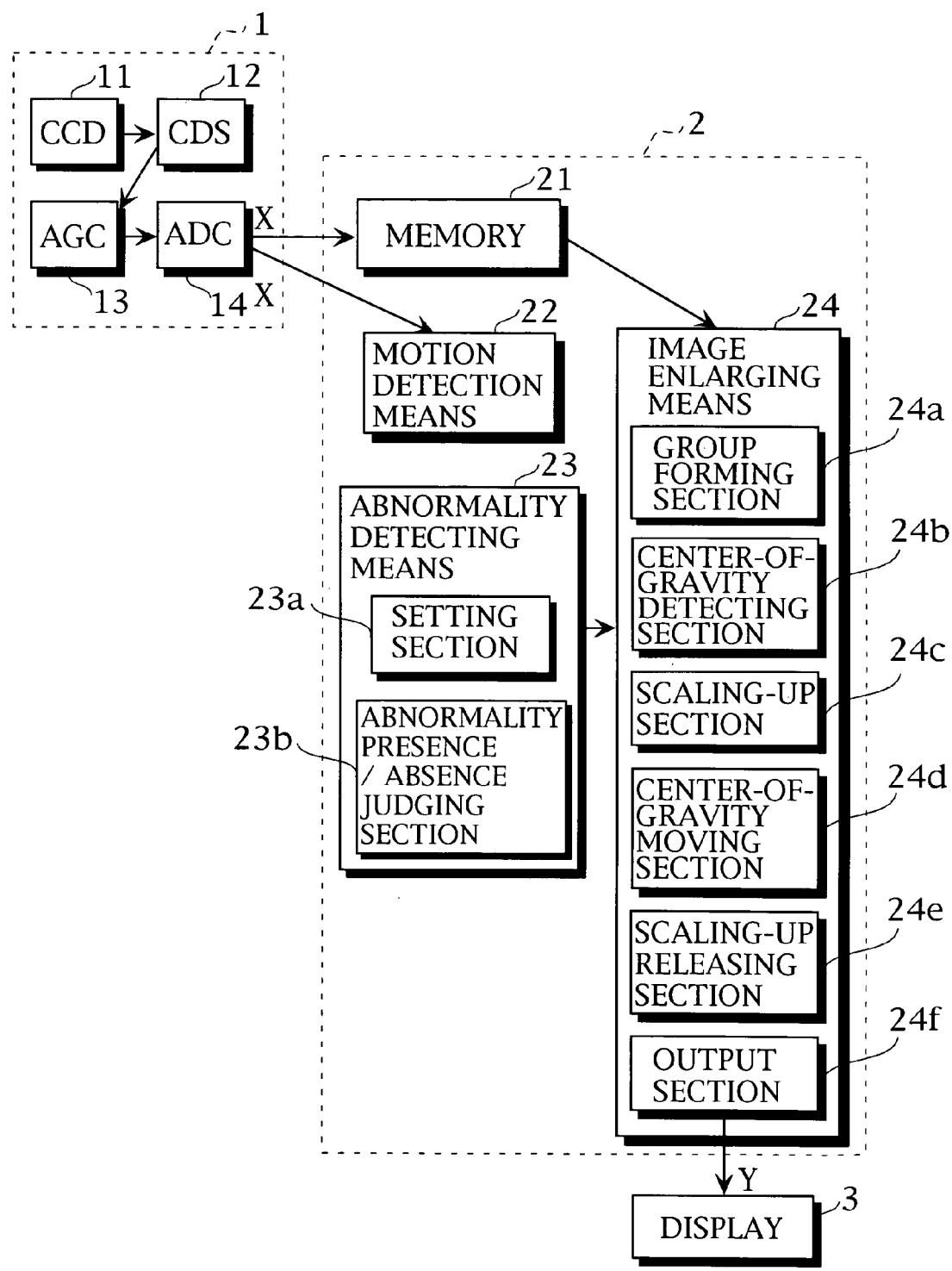
FIG. 1 is a block diagram showing the configuration of a monitoring system.

Referring now to the drawings, an embodiment in a case where the present invention is applied to a monitoring system will be described.

FIG. 1 illustrates the configuration of the monitoring system.

The monitoring system comprises a video camera (a monitoring camera) 1 for imaging a subject, a camera signal processor 2 for processing an image signal (a camera signal) X outputted from the monitoring camera 1, and a display device 3 for displaying the image signal outputted from the camera signal processor 2.

The monitoring camera 1 comprises a CCD 11, a correlation double sampling section (CDS) 12, an automatic gain control section (AGC) 13, and an analog-to-digital converting section (ADC) 14.

The image signal obtained by the CCD 11 is outputted through the correlation double sampling section (CDS) 12, the automatic gain control section (AGC) 13, and the analog-to-digital converting section (ADC) 14.

The camera signal processor 2 comprises a memory 21, motion detection means 22, abnormality detecting means 23, and image enlarging means 24.

Figure 3:
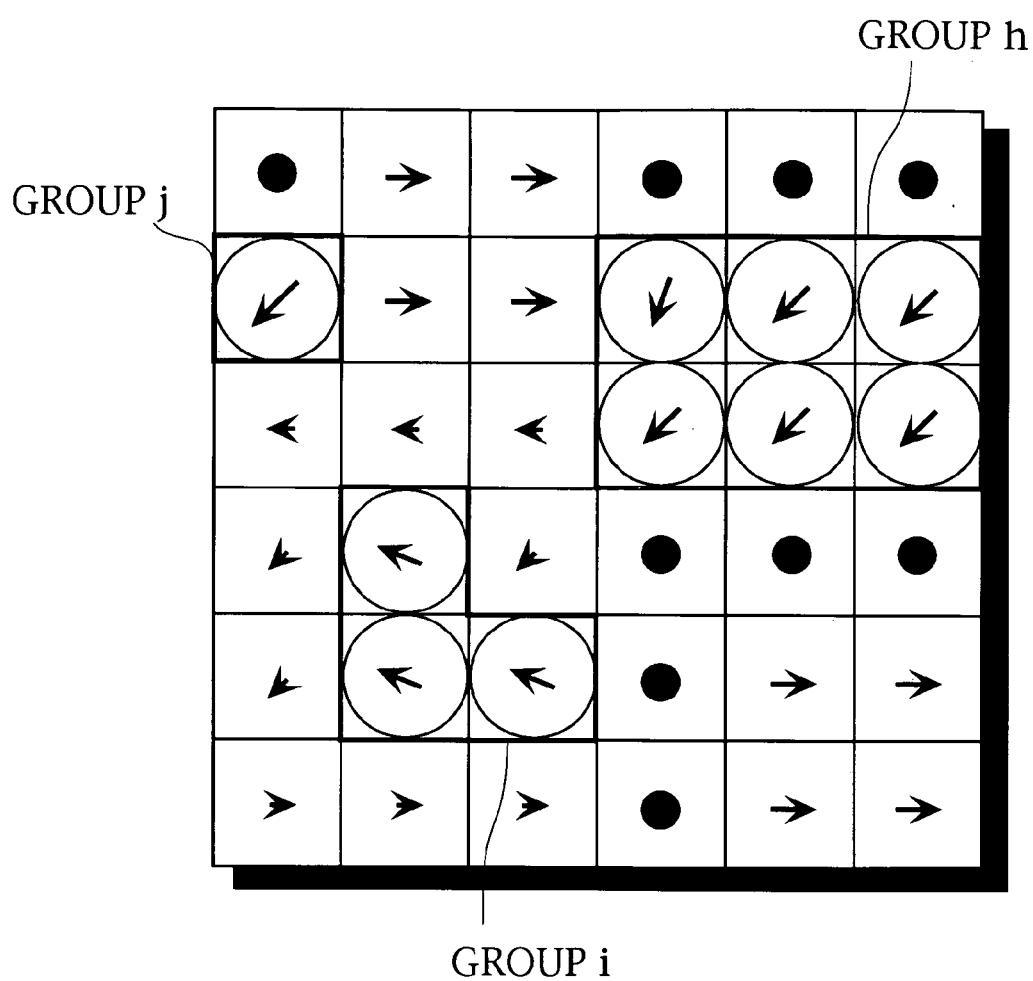
FIG. 3 is a schematic view showing a motion detection area.

The camera signal outputted from the monitoring camera 1 is fed to the memory 21 and is fed to the motion detection means 22. An image signal corresponding to one field is stored in the memory 21. The motion detection means 22 divides a screen corresponding to one field into 36 areas, for example, as shown in FIG. 3, and compares the screen with a screen corresponding to a field which is an arbitrary number of fields ahead of the one field for each of the areas (motion detection areas), to detect a motion vector for the motion detection area.

The abnormality detecting means 23 detects, on the basis of the motion vector for each of the motion detection areas which has been detected by the motion detection means 22, the motion detection area where an object making abnormal motion exists. The image enlarging means 24 enlarges the detected motion detection area where an object making abnormal motion exists which has been detected by the abnormality detecting means 23, to output the enlarged motion detection area as an image signal Y.

The abnormality detecting means 23 comprises a setting section 23a for previously setting an abnormal motion pattern in order to detect a motion detection area where an object making abnormal motion exists, and an abnormality presence/absence judging section 23b for judging whether or not there is a motion detection area where an object making abnormal motion exists within the screen corresponding to one field.

Specifically, the abnormal motion pattern is set in the setting section 23a by a motion component in the X direction and a motion component in the Y direction such that the horizontal motion component is m and the vertical motion component is n. In a case where the horizontal motion component is set to 1, and the vertical motion component is set to 0, when a motion vector whose horizontal component is one or more is detected irrespective of whether it is moved in a horizontal direction or an oblique direction, it is judged that the motion detection area where the motion vector is detected is an area where an object making abnormal motion exists. In a case where both the horizontal motion component and the vertical motion component are set to 0, when a motion vector whose component is not less than zero is detected, it is judged that the motion detection area where the motion vector is detected is an area where an object making abnormal motion exists.

A normal motion pattern may be set in the setting section 23a. In this case, the motion detection area where the detected motion vector does not correspond to the normal motion pattern may be detected as a motion detection area where an object making abnormal motion exists.

The image enlarging means 24 comprises a group forming section 24a, a center-of-gravity detecting section 24b, a scaling-up section 24c, a center-of-gravity moving section 24d, a scaling-up releasing section 24e, and an output section 24f.

The group forming section 24a groups, out of the motion detection areas where an object making abnormal motion exists which have been detected by the abnormality detecting means 23, the motion detection areas where an object making abnormal motion exists such that the motion detection areas connected to each other form one group.

The center-of-gravity detecting section 24b extracts the group having the largest area out of the plurality of groups formed by the group forming section 24a, to find the center of gravity of the group by performing an operation.

The scaling-up section 24c scales up a part of an image corresponding to one frame obtained from the monitoring camera 1, centered on the center of gravity found by the center-of-gravity detecting section 24b.

The center-of-gravity moving section 24d follows, when the center of gravity detected by the center-of-gravity detecting section 24b is moved in a state where a part of the image is scaled up by the scaling-up section 24c, the motion, to move the center of the enlarged image.

The scaling-up releasing section 24e releases the image scaling-up processing by the scaling-up section 24c when the abnormality presence/absence judging section 23b in the abnormality detecting means 23 judges that there is no area where an object making abnormal motion exists.

The output section 24f outputs as an image signal Y the image data corresponding to one field stored in the memory 21 or data representing the image scaled up by the scaling-up section 24c.

Figure 2:
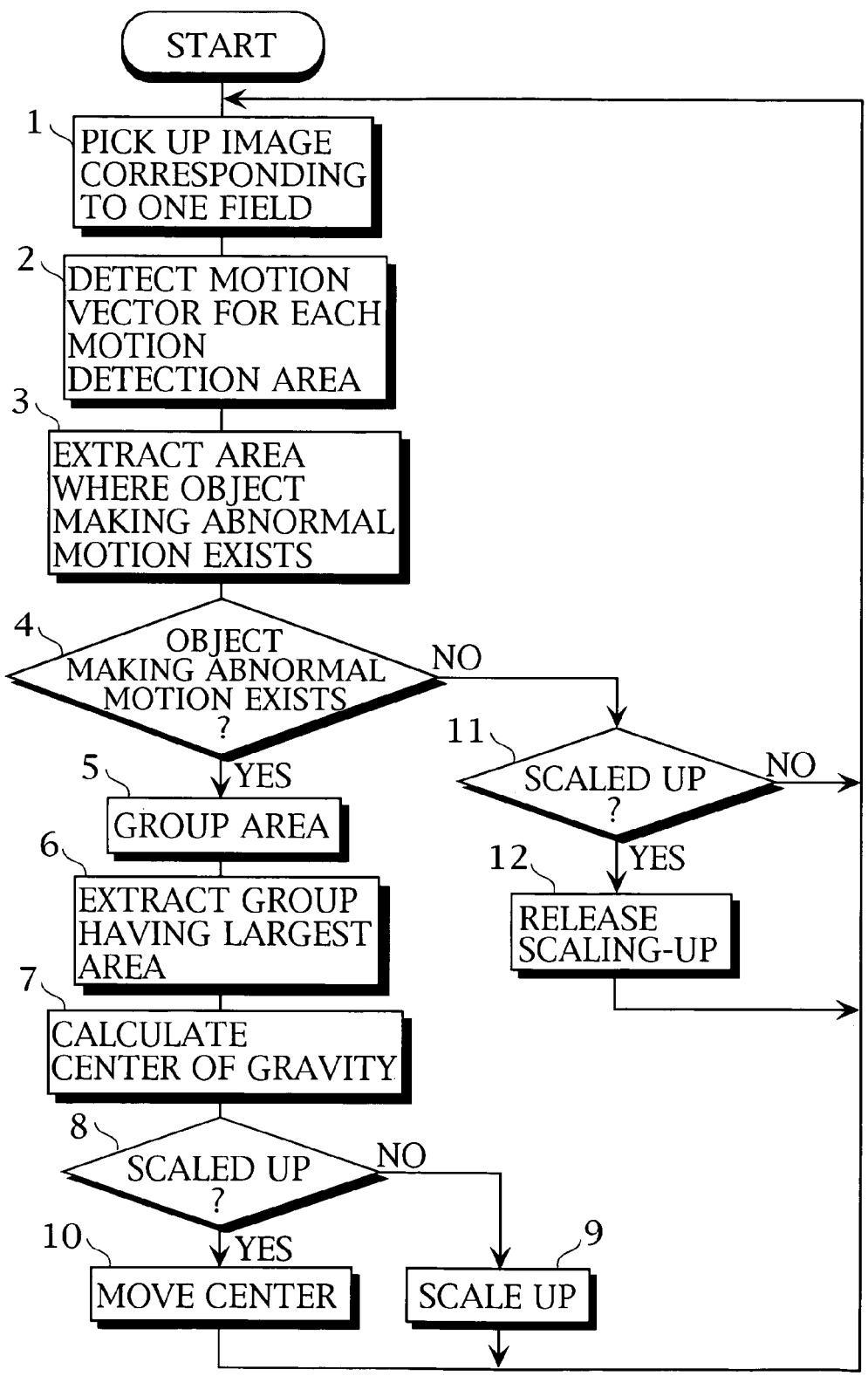
FIG. 2 is a flow chart showing the operation of the monitoring system.

FIG. 2 shows the operation of the monitoring system.

An image corresponding to one field is first picked up by the monitoring camera 1 (step 1). The image corresponding to one field which has been picked up by the monitoring camera 1 is stored in the memory 21 in the camera signal processor 2 and is fed to the motion detection means 22.

The motion detection means 22 then compares the fed image with an image inputted an arbitrary number of fields ahead of the image, to detect a motion vector for each of the motion detection areas shown in FIG. 3 (step 2).

The abnormality detecting means 23 then extracts the motion detection area where an object making abnormal motion exists on the basis of the motion vector for each of the motion detection areas which has been detected at the step 2 (step 3). Specifically, it is judged whether or not any of the motion vectors detected for the motion detection areas correspond to the abnormal motion pattern set in the setting section 23a, and extracts, if any one of the motion vectors corresponds to the abnormal motion pattern, the motion detection area as an area where an object making abnormal motion exists.

The motion detection area with "circle mark" out of the motion detection areas shown in FIG. 3 shall be extracted as an area where an area making abnormal motion exists.

It is then judged at the foregoing step 3 whether or not the motion detection area where an object making abnormal motion exists is extracted (step 4). Specifically, it is judged whether or not any one of the motion detection areas is extracted as an area where an object making abnormal motion exists.

When it is judged that the motion detection area where an object making abnormal motion exists is extracted, the group forming section 24a groups the motion detection areas where an object making abnormal motion exists out of the motion detection areas where an object making abnormal motion exists which have been extracted at the step 3 such that the motion detection areas connected to each other form one group (step 5).

As shown in FIG. 3, the motion detection areas extracted as the areas where an object making abnormal motion exists shall be grouped to form three groups h, i, and j.

The center-of-gravity detecting section 24b then extracts the group having the largest area out of the groups formed by the group forming section 24a (step 6). In the example shown in FIG. 3, the group h is extracted as the group having the largest area.

The center-of-gravity detecting section 24b calculates the center of gravity of the group having the largest area which has been extracted at the step 6 (step 7). In the example shown in FIG. 3, the center of gravity of the group h is found. Specifically, the coordinates (xg, yg) of the center of gravity of each of six areas belonging to the group h are found, to find the average *xg of the X coordinates xg and the average *yg of the Y coordinates yg of the respective centers of gravity of the found areas. The coordinates (*xg, *yg) are the center of gravity of the group h.

It is then judged whether an image currently displayed on the display device 3 is an image scaled up by the scaling-up section 24c or is an image (non-enlarged image) stored in the memory 21 (step 8).

When the image displayed on the display device 3 is the image stored in the memory 21, the scaling-up section 24c scales up the image stored in the memory 21, centered on the center of gravity found by the center-of-gravity detecting section 24b (step 9). The magnification at this time may be previously determined to be ×2, for example, or may be changed depending on the size of the group to be scaled up. Data representing the image scaled up by the scaling-up section 24c is fed to the display device 3 through the output section 24f. Thereafter, the program is returned to the step 1. At the step 1, an image corresponding to the subsequent one field is then picked up.

When it is judged at the step 8 that the image currently displayed on the display device 3 is the image scaled up by the scaling-up section 24c, the center-of-gravity moving section 24d judges whether or not the center of gravity found at the step 7 is changed from the center of gravity found in the preceding field. If it is changed, a position at a destination of motion is found in accordance with a predetermined rule, to move the position of the center of the image scaled up by the scaling-up section 24c to the position at the destination of motion (step 10). Thereafter, the program is returned to the step 1. At the step 1, an image corresponding to the subsequent one field is picked up.

The predetermined rule at the step 10 is such a rule that a relationship expressed by the following equation (1) holds, letting (X(n−1), Y(n−1)) be the center of gravity found in the preceding field, (X(n0), Y(n0)) be the center of gravity found in the current field, and (X(n), Y(n)) be the position at the destination of motion:

$$X(n)=X(n-1)+(X(n0)-X(n-1))k$$

$$Y(n)=Y(n-1)+(Y(n0)-Y(n-1))k \quad (1)$$

k in the equation (1) is a follow-up coefficient.

When the center of the enlarged image is suddenly moved to the center of gravity calculated in the current field from the center of gravity calculated in the preceding field, the center of gravity is greatly changed. Accordingly, the displayed image is rapidly changed, so that the image is difficult to see. Therefore, follow-up characteristics are purposely delayed using the above-mentioned rule.

When it is judged at the foregoing step 4 that an area where an object making abnormal motion exists is not extracted, it is judged whether or not the image currently displayed on the display device 3 is an image scaled up by the scaling-up section 24c or is an image (non-enlarged image) stored in the memory 21 (step 11).

When the image displayed on the display device 3 is the image stored in the memory 21, the program is returned to the step 1. At the step 1, an image corresponding to the succeeding field is picked up. When the image displayed on the display device 3 is the image scaled up by the scaling-up section 24c, it is judged that there is no object making abnormal motion, so that there is no reason for enlarging the image. Accordingly, the scaling-up processing is released by the scaling-up releasing section 24e (step 12). Data representing the image stored in the memory 21 is fed to the display device 3 through the output section 24f. Thereafter, the program is returned to the step 1. At the step 1, an image corresponding to the succeeding field is picked up.

The above-mentioned processing is repeatedly performed. When an object (subject) making abnormal motion exists in an image, therefore, the image can be scaled up, centered on a part of the subject, and displayed.

In the above-mentioned embodiment, the motion detection means 22 detects a motion vector for each of motion detection areas, and the abnormality detecting means 23 judges whether or not there is a motion detection area where an object making abnormal motion exists on the basis of the motion vector for the motion detection area which has been detected by the motion detection means 22. The present invention is not limited to the same. The motion detection means 22 may detect the difference in luminance between the current field and a field which is an arbitrary number of fields ahead of the current field for each of motion detection areas, to judge whether or not there is a motion detection area where an object making abnormal motion exists on the basis of the difference in luminance for the motion detection area which has been detected by the motion detection means 22. For example, the motion detection area where the difference in luminance is not less than a predetermined value may be judged to be an area where an object making abnormal motion exists.

The present invention detects and follows a subject making abnormal motion. Although the present invention is particularly suitable for a monitoring camera system, therefore, it can be utilized for a home video camera or the like.

What is claimed is:

1. A camera signal processor characterized by comprising:
   motion detection means for dividing an image picked up by imaging means into a plurality of motion detection areas, and detecting the motion pattern of the image for each of the motion detection areas;
   extracting means for extracting, on the basis of the motion pattern of the image for each of the motion detection areas which has been detected by the motion detection means, the motion detection area where an object making abnormal motion exists; and
   image enlarging means for enlarging the image picked up by the imaging means, centered on the motion detection area where an object making abnormal motion exists which has been extracted by the extracting means and displaying the enlarged image on a display device, said image enlarging means comprising group forming means for grouping, out of the motion detection areas where an object making abnormal motion exists which have been extracted by the extracting means, the areas where an object making abnormal motion exists such that the areas connected to each other form group: center-of-gravity detecting means for extracting, out of groups formed by the group forming means, the group having the largest area, and finding the center of gravity of the extracted group; and scaling-up means for scaling up the image picked up by the imaging means, centered on the center of gravity found by center-of-gravity detecting means, and displaying the scaled-up image on a display device.

2. A camera signal processing method characterized by comprising:
   the first step of dividing an image picked up by imaging means into a plurality of motion detection areas, and detecting the motion pattern of the image for each of the motion detection areas;

the second step of extracting, on the basis of the motion pattern of the image for each of the motion detection areas which has been detected at the first step, the motion detection area where an object making abnormal motion exists; and the third step of enlarging the image picked up by the imaging means, cnetered on the motion detection area where an object making abnormal motion exists which has been extracted at the second step and displaying the enlarged image on a display device, said third step comprising the fourth step of grouping, out of the motion detection areas where an object making abnormal motion exists which have been extracted at the second step, the areas where an object making abnormal motion exists such that the areas connected to each other form one group; the fifth step of extracting, out of groups formed at the fourth step, the group having the largest area, and finding the center of gravity of the extracted group; and the sixth step of scaling up the image picked up by the imaging means, centered on the center of gravity found at the fifth step, and displaying the scaled-up image on a display device.

3. A camera a signal processor characterized by comprising:

motion detection means for dividing an image picked up by imaging means into a plurality of motion detection areas, and detecting the motion pattern of the image for each of the motion detection areas;

extracting means for extracting, on the basis of the motion pattern of the image for each of the motion detection areas which has been detected by the motion detection means, the motion detection area where an object making abnormal motion exists; and image enlarging means for enlarging the image picked tip by the imaging means, centered on the motion detection area where an object making abnormal motion exists which has been extracted by the extracting means and displaying the enlarged image on a display device, said image enlarging means comprising group forming means for grouping, out of the motion detection areas where an object making abnormal motion exists which have been extracted by the extracting means, the areas where an object making abnormal motion exists such that the areas connected to each other form one group; center-of-gravity detecting means for extracting, out of groups formed by the group forming means, the group having the largest area, and finding the center of gravity of the extracted group; and scaling-up means for scaling up the image picked up by the imaging means, centered on the center of gravity found by the center-of-gravity detecting means, and displaying the scaled-up image on a display device;

wherein the extracting means extracts, out of the motion detection areas, the motion detection area where the motion pattern of the image which has been detected by the motion detection means coincides with an abnormal motion pattern previously set as the motion detection area where an object making abnormal motion exists.

4. A camera signal processing method characterized by comprising:

the first step of dividing an image picked up by imaging means into a plurality of motion detection areas, and detecting the motion pattern of the image for each of the motion detection areas;

the second step of extracting, on the basis of the motion pattern of the image for each of the motion detection areas which has been detected at the first step, the motion detection area where an object making abnormal motion exists; and the third step of enlarging the image picked up by the imaging means, centered on the motion detection area where an object making abnormal motion exists which has been extracted at the second step and displaying the enlarged image on a display device, said third step comprising the fourth step of grouping, out of the motion detection areas where an object making abnormal motion exists which have been extracted it the second step, the areas where an object making abnormal motion exists such that the areas connected to each other form one group; the fifth step of extracting, out of groups formed at the fourth step, the group having the largest area, and finding the center of gravity of the extracted group; and the sixth step of scaling up the image picked up by the imaging means, centered on the center of gravity found at the fifth step, and displaying the scaled-up image on a display device, wherein the second step comprises the step of extracting, out of the motion detection areas, the motion detection area where the motion pattern of the image which has been detected at the first step coincides with an abnormal motion pattern previously set as the motion detection area where an object making abnormal motion exists.

* * * * *